United States Patent
Rajtmajer et al.

(10) Patent No.: US 9,821,700 B2
(45) Date of Patent: Nov. 21, 2017

(54) INTEGRATED CHARGING UNIT FOR PASSIVE REFRIGERATION SYSTEM

(71) Applicant: THERMO KING CORPORATION, Minneapolis, MN (US)

(72) Inventors: Václav Rajtmajer, Beroun (CZ); Michal Kolda, Prague (CZ); Markéta Kopecka, Prague (CZ); Michal Hegar, Prague (CZ); Pavel Houdek, Kutna Hora (CZ)

(73) Assignee: THERMO KING CORPORATION, Minneapolis, MN (US)

( * ) Notice: Subject to any disclaimer, the term of this patent is extended or adjusted under 35 U.S.C. 154(b) by 707 days.

(21) Appl. No.: 14/268,669

(22) Filed: May 2, 2014

(65) Prior Publication Data

US 2015/0314671 A1 Nov. 5, 2015

(51) Int. Cl.
- *B60H 1/32* (2006.01)
- *B60P 3/20* (2006.01)
- *B60H 1/00* (2006.01)

(52) U.S. Cl.
CPC ............... *B60P 3/20* (2013.01); *B60H 1/005* (2013.01); *B60H 1/323* (2013.01); *B60H 1/3208* (2013.01); *B60H 1/3211* (2013.01); *B60H 1/3232* (2013.01); *B60H 2001/3289* (2013.01)

(58) Field of Classification Search
CPC ...... B60H 1/323; B60H 1/005; B60H 1/0045; B60H 1/3208; B60H 1/3222; F25D 3/06
See application file for complete search history.

(56) References Cited

U.S. PATENT DOCUMENTS

| | | | |
|---|---|---|---|
| 1,873,131 | A | 8/1932 | Josephson |
| 1,980,089 | A | 11/1934 | Rice, Jr. |
| 2,123,678 | A | 7/1938 | Madden |
| 2,298,896 | A | 10/1942 | Meyer |

(Continued)

FOREIGN PATENT DOCUMENTS

| | | |
|---|---|---|
| EP | 2053325 | 4/2009 |
| EP | 2570280 | 9/2011 |

(Continued)

OTHER PUBLICATIONS

International search report for International application No. PCT/US2015/028813, dated Jul. 23, 2015 (3 pages).

(Continued)

*Primary Examiner* — Cassey D Bauer
(74) *Attorney, Agent, or Firm* — Hamre, Schumann, Mueller & Larson, P.C.

(57) ABSTRACT

A transport refrigeration system (TRS), a refrigerated transport unit, and a method of charging a thermal accumulator in a TRS are disclosed. The TRS includes a thermal accumulator including a phase change material (PCM) configured in a first state, to absorb thermal energy from the interior space of the transport unit during transformation to a second state. A heat exchanger, a portion of which is disposed within the thermal accumulator, is in thermal communication with the PCM. The TRS also includes an expansion device and a transport refrigeration unit (TRU). A heat transfer fluid circuit connects the TRU and the heat exchanger, and is configured to direct a heat transfer fluid from the TRU to the heat exchanger via the expansion device for charging the PCM.

19 Claims, 3 Drawing Sheets

(56) References Cited

U.S. PATENT DOCUMENTS

| | | |
|---|---|---|
| 4,276,752 A | 7/1981 | Modler et al. |
| 4,347,892 A | 9/1982 | Clyne et al. |
| 4,393,918 A | 7/1983 | Patry |
| 4,413,474 A | 11/1983 | Moscrip |
| 4,502,293 A | 3/1985 | Franklin, Jr. |
| 4,612,974 A | 9/1986 | Yanadori et al. |
| 4,756,164 A | 7/1988 | James et al. |
| 4,856,296 A | 8/1989 | Shu |
| 4,924,935 A | 5/1990 | Van Winckel |
| 4,976,910 A | 12/1990 | Gatley et al. |
| 5,054,295 A | 10/1991 | Goulooze |
| 5,129,235 A | 7/1992 | Renken et al. |
| 5,161,848 A | 11/1992 | Lutton |
| 5,211,900 A | 5/1993 | Ziegler |
| 5,259,199 A | 11/1993 | Franklin |
| 5,327,746 A | 7/1994 | Duh |
| 5,363,670 A | 11/1994 | Bartilucci |
| 5,423,193 A | 6/1995 | Claterbos |
| 5,653,119 A * | 8/1997 | Kimura ............... B60H 1/3222 62/197 |
| 5,660,057 A | 8/1997 | Tyree, Jr. |
| 5,704,676 A | 1/1998 | Hill |
| 5,860,287 A | 1/1999 | O'Neal |
| 5,870,897 A | 2/1999 | Barr et al. |
| 5,946,933 A | 9/1999 | Clarke et al. |
| 5,979,173 A | 11/1999 | Tyree |
| 6,059,016 A | 5/2000 | Rafalovich et al. |
| 6,161,394 A | 12/2000 | Alsenz |
| 6,216,469 B1 | 4/2001 | Miller |
| 6,345,509 B1 | 2/2002 | Garlov et al. |
| 6,543,245 B1 | 4/2003 | Waldschmidt et al. |
| 6,758,057 B2 | 7/2004 | Vince, II et al. |
| 7,237,404 B2 | 7/2007 | Morano et al. |
| 7,246,496 B2 | 7/2007 | Goenka et al. |
| 7,600,391 B2 | 10/2009 | Naik et al. |
| 8,136,368 B2 | 3/2012 | Reich et al. |
| 8,220,284 B2 | 7/2012 | Tsubone |
| 8,726,688 B2 | 5/2014 | Ghiraldi |
| 2002/0084769 A1* | 7/2002 | Iritani ............... B60H 1/3208 320/104 |
| 2004/0194498 A1 | 10/2004 | Burchill et al. |
| 2008/0011007 A1* | 1/2008 | Larson ............... B60H 1/00428 62/323.2 |
| 2008/0197139 A1 | 8/2008 | Goncharko et al. |
| 2009/0019864 A1 | 1/2009 | Bruce et al. |
| 2009/0058239 A1 | 3/2009 | Kuo et al. |
| 2010/0018667 A1 | 1/2010 | Khelifa et al. |
| 2010/0058791 A1 | 3/2010 | Quesada Saborio |
| 2010/0180614 A1 | 7/2010 | Larson et al. |
| 2010/0251751 A1 | 10/2010 | Lurken et al. |
| 2010/0305794 A1 | 12/2010 | Foster |
| 2011/0023509 A1 | 2/2011 | Gardiner |
| 2011/0067852 A1 | 3/2011 | Farrar |
| 2011/0079023 A1 | 4/2011 | Goenka et al. |
| 2011/0083827 A1 | 4/2011 | Salyer |
| 2011/0210164 A1 | 9/2011 | Babinsky et al. |
| 2011/0247357 A1 | 10/2011 | Sugitani |
| 2011/0314812 A1 | 12/2011 | Sonwane |
| 2012/0000222 A1 | 1/2012 | Fink et al. |
| 2012/0037342 A1 | 2/2012 | Holloway et al. |
| 2012/0055180 A1 | 3/2012 | Larson et al. |
| 2012/0056474 A1 | 3/2012 | Larson et al. |
| 2012/0152511 A1 | 6/2012 | Chang et al. |
| 2012/0312036 A1 | 12/2012 | Koppineedi et al. |
| 2013/0042603 A1 | 2/2013 | Newman |
| 2013/0047630 A1 | 2/2013 | Lu |
| 2013/0048647 A1 | 2/2013 | Farrar et al. |
| 2013/0101502 A1 | 4/2013 | McAlister |
| 2013/0158828 A1 | 6/2013 | McAlister |
| 2013/0283827 A1 | 10/2013 | Wang et al. |
| 2015/0274415 A1 | 10/2015 | Farrar et al. |
| 2015/0314671 A1 | 11/2015 | Rajtmajer et al. |
| 2015/0316301 A1 | 11/2015 | Kolda et al. |
| 2015/0316309 A1 | 11/2015 | Reitz et al. |
| 2015/0316311 A1 | 11/2015 | Kopecka et al. |

FOREIGN PATENT DOCUMENTS

| | | |
|---|---|---|
| EP | 2684716 | 1/2014 |
| GB | 2180049 | 3/1987 |
| JP | 2005271949 | 10/2005 |
| KR | 20-0165489 | 2/2000 |
| KR | 10-2002-0066540 | 8/2002 |
| KR | 10-0916217 | 1/2009 |
| KR | 10-2010-0004693 | 1/2010 |
| KR | 10-2010-0064738 | 6/2010 |
| KR | 20-2012-0000196 | 1/2012 |
| KR | 10-2012-0037115 | 4/2012 |
| KR | 101336592 | 12/2013 |
| WO | 2008061330 | 5/2008 |
| WO | 2011000224 | 1/2011 |
| WO | 2011035102 | 3/2011 |
| WO | 2012045132 | 4/2012 |
| WO | 2012113600 | 8/2012 |
| WO | 2012161718 | 11/2012 |
| WO | 2013088190 | 6/2013 |
| WO | 2013176776 | 11/2013 |
| WO | 2014055525 | 4/2014 |
| WO | 2014178015 | 11/2014 |
| WO | 2014184763 | 11/2014 |

OTHER PUBLICATIONS

Written opinion for International application No. PCT/US2015/028788, dated Jul. 23, 2015 (10 pages).
International search report for International application No. PCT/US2015/028788, dated Jul. 23, 2015 (3 pages).
International search report for International application No. PCT/US2015/028790, dated Aug. 19, 2015 (3 pages).
International search report for International application No. PCT/US2015/028792, dated Jul. 22, 2015 (3 pages).
International search report for International application No. PCT/US2014/036555, dated Oct. 29, 2014 (3 pages).
International search report for International application No. PCT/US2014/036552, dated Nov. 7, 2014 (3 pages).
International search report for International application No. PCT/US2015/028810, dated Jul. 23, 2015 (3 pages).
"http://www.carrier.com/truck-trailer/en/north-america/products/na-truck-trailer/vector-hybrid-trailer-refrigeration/"; Carrier Transicold; Copyright 2016.

* cited by examiner

INTEGRATED CHARGING UNIT FOR PASSIVE REFRIGERATION SYSTEM

FIELD

This disclosure is generally directed to a transport refrigeration system (TRS). More specifically, the disclosure is related to a TRS including a thermal accumulator having a phase change material (PCM) and a transport refrigeration unit (TRU).

BACKGROUND

A transport refrigeration system (TRS) is generally used to control an environmental condition such as, but not limited to, temperature, humidity, air quality, or the like, of a refrigerated transport unit. Examples of transport units include, but are not limited to, a container on a flat car, an intermodal container, a truck, a boxcar, or other similar transport unit (generally referred to as a "transport unit"). A refrigerated transport unit is commonly used to transport perishable items such as, but not limited to, produce, frozen foods, and meat products. Generally, a transport refrigeration unit (TRU) is attached to the refrigerated transport unit to control the environmental condition of a cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

This disclosure is generally directed to a transport refrigeration system (TRS). More specifically, the disclosure is related to a TRS including a thermal accumulator having a phase change material (PCM) and a transport refrigeration unit (TRU).

A suitable thermal accumulator or thermal accumulator module is described in U.S. patent application Ser. No. 14/268,239, filed on May 2, 2014, and titled "Thermal Accumulator for a Transport Refrigeration System," which is incorporated herein by reference in its entirety.

In some embodiments, a TRU and a heat exchanger disposed within a thermal accumulator are in communication via a heat transfer fluid circuit. The heat transfer fluid circuit is configured to direct a heat transfer fluid from the TRU to the heat exchanger via an expansion device for charging the PCM.

In some embodiments, a TRU is a low capacity TRU. In some embodiments, a low capacity TRU can include a low speed primary mover. A low capacity TRU can be included with a TRS having one or more thermal accumulators in order to keep a PCM contained in the one or more thermal accumulators within an on-phase temperature operating range. In some embodiments, a low capacity TRU can extend a distance a refrigerated transport unit can travel with temperature sensitive cargo without stopping to charge the one or more thermal accumulators. In some embodiments, a low capacity TRU is lighter than a high capacity TRU, which can provide better fuel efficiency than a high capacity or variable capacity TRU. In some embodiments, a low capacity TRU can operate within operating constraints (e.g., government regulations, etc.) such as, but not limited to, sound limits, environmental efficiency, or the like. In some embodiments, a low capacity TRU can operate with a low power input. That is, in some embodiments, a low capacity TRU can consume less power than, for example, a high capacity TRU.

In some embodiments, a TRU is a high capacity TRU. A high capacity TRU can, in some embodiments, include a high speed primary mover. A high capacity TRU can be included with a TRS having one or more thermal accumulators in order to charge a PCM to a first state. In some embodiments, the high capacity TRU can be used only when a low cost electrical source is available (e.g., shore power, etc.). In some embodiments, a high capacity TRU can be enabled to charge the thermal accumulators when a refrigerated transport unit is not in transit (e.g., overnight, etc.) and disabled while the refrigerated transport unit is in transit.

In other embodiments, a TRU is a variable capacity TRU capable of operating at either a high capacity or a low capacity. In such embodiments, the variable capacity TRU can include a variable speed primary mover capable of operating at either a high speed or a low speed. In such embodiments, the TRU can operate in a high capacity mode when a low cost electrical source is available (e.g., shore power, etc.) or can run in a low capacity mode when in transit (e.g., to extend a duration of a trip, etc.).

A transport refrigeration system (TRS) for controlling refrigeration in an interior space of a transport unit is described. The TRS includes a thermal accumulator including a phase change material (PCM) configured in a first state, to absorb thermal energy from the interior space of the transport unit during transformation to a second state. A heat exchanger, a portion of which is disposed within the thermal accumulator, is in thermal communication with the PCM. The TRS also includes an expansion device and a transport refrigeration unit (TRU). A heat transfer fluid circuit connects the TRU and the heat exchanger, and is configured to direct a heat transfer fluid from the TRU to the heat exchanger via the expansion device for charging the PCM.

A method of charging a thermal accumulator in a transport refrigeration system (TRS) for a transport unit is described. The thermal accumulator includes a phase change material (PCM) a heat exchanger, and a heat transfer fluid circuit that connects a transport refrigeration unit (TRU) with the heat exchanger. The method includes determining a PCM temperature based on a temperature corresponding to the PCM and comparing the PCM temperature to a PCM temperature condition to obtain a comparison result. The method further includes enabling the TRU based on the comparison result.

A refrigerated transport unit is described. The refrigerated transport unit includes a transport unit including an interior space and a transport refrigeration system (TRS). The TRS includes a thermal accumulator including a phase change material (PCM) configured in a first state, to absorb thermal energy from the interior space of the transport unit during transformation to a second state. A heat exchanger, a portion of which is disposed within the thermal accumulator, is in thermal communication with the PCM. The TRS also includes an expansion device and a transport refrigeration unit (TRU). A heat transfer fluid circuit connects the TRU and the heat exchanger, and is configured to direct a heat transfer fluid from the TRU to the heat exchanger via the expansion device for charging the PCM.

Comments:

The following is noted with respect to the embodiments described herein.

The thermal accumulator discussed herein can include a PCM that is adaptable to heat or to cool a storage space (e.g., a cargo compartment) to a temperature suitable for the cargo stored in the storage space. The thermal accumulator can also be used for a defrost operation within the storage space.

Operation of the TRS for a refrigerated transport unit can be independent to various thermal loads that occur due to external conditions external the refrigerated transport unit. That is, the thermal accumulator of the TRS can maintain a desired temperature within the storage space of the refrigerated transport unit regardless of external conditions outside of the refrigerated transport unit.

The PCM used in the thermal accumulator can be any fluid which has a solid-liquid transition point in a rage between about −32° C. and about 0° C. The PCM can be compatible with metals, for example, aluminum. The PCM can store heat in a transition phase using a latent heat (e.g., heat of fusion). The PCM can store heat in a liquid phase. The PCM can have a phase transition temperature that absorbs changes in temperature of the refrigerated transport unit.

The thermal accumulator allows a transfer of heat from the PCM to an air space within the storage space and vice versa. The heat exchanger can include a single, dual, or multiple pass design. The thermal accumulator can use a natural or forced convection to facilitate heat exchange between the PCM and an air space within the storage space. In some embodiments, the thermal accumulator can include a wall or walls with a substantially flat surface and a wall or walls with at least a partially enhanced (e.g., ribbed surface). The thermal accumulator can store a PCM and/or include an empty or free expansion space within the thermal accumulator.

In some embodiments, a thermal accumulator compartment storing a thermal accumulator can be retrofitted into/onto a refrigerated transport unit. The thermal accumulator compartment can be installed to the refrigerated transport unit without specialized equipment. In some embodiments, the thermal accumulator compartment can be designed such that the weight of the thermal accumulator compartment can be supported by a floor, one or more side walls or a ceiling of the refrigerated transport unit. In some embodiments, the PCM can be provided in the thermal accumulator from the top.

The TRS can provide a defrost operation. In some embodiments, a second fluid or refrigerant may be used to perform a defrost operation. In some embodiments, the TRS can include an optional defrost device (e.g., heating bar(s), heating sheet(s), heating tube(s), etc.) for performing the defrost operation. In some embodiments, the thermal accumulator can include a second fluid or refrigerant line to perform the defrost operation. In some embodiments, the defrost operation can be performed in less than 24 hours.

In some embodiments, the TRS can include one or more fans. The power of the fans can be adjusted based on a temperature within the storage space. The fans can provide an air flow rate sufficient to reach a desired amount of heat transfer from the PCM in the thermal accumulator to an air space within the storage space and vice versa. The fans can be controlled/adjusted based on a desired set point temperature within the storage space.

BRIEF DESCRIPTION OF THE DRAWINGS

References are made to the accompanying drawings that form a part of this disclosure and which illustrate embodiments in which the systems and methods described in this specification can be practiced.

Like reference numbers and designations in the various drawings represent like elements throughout.

DETAILED DESCRIPTION

Figure 1:
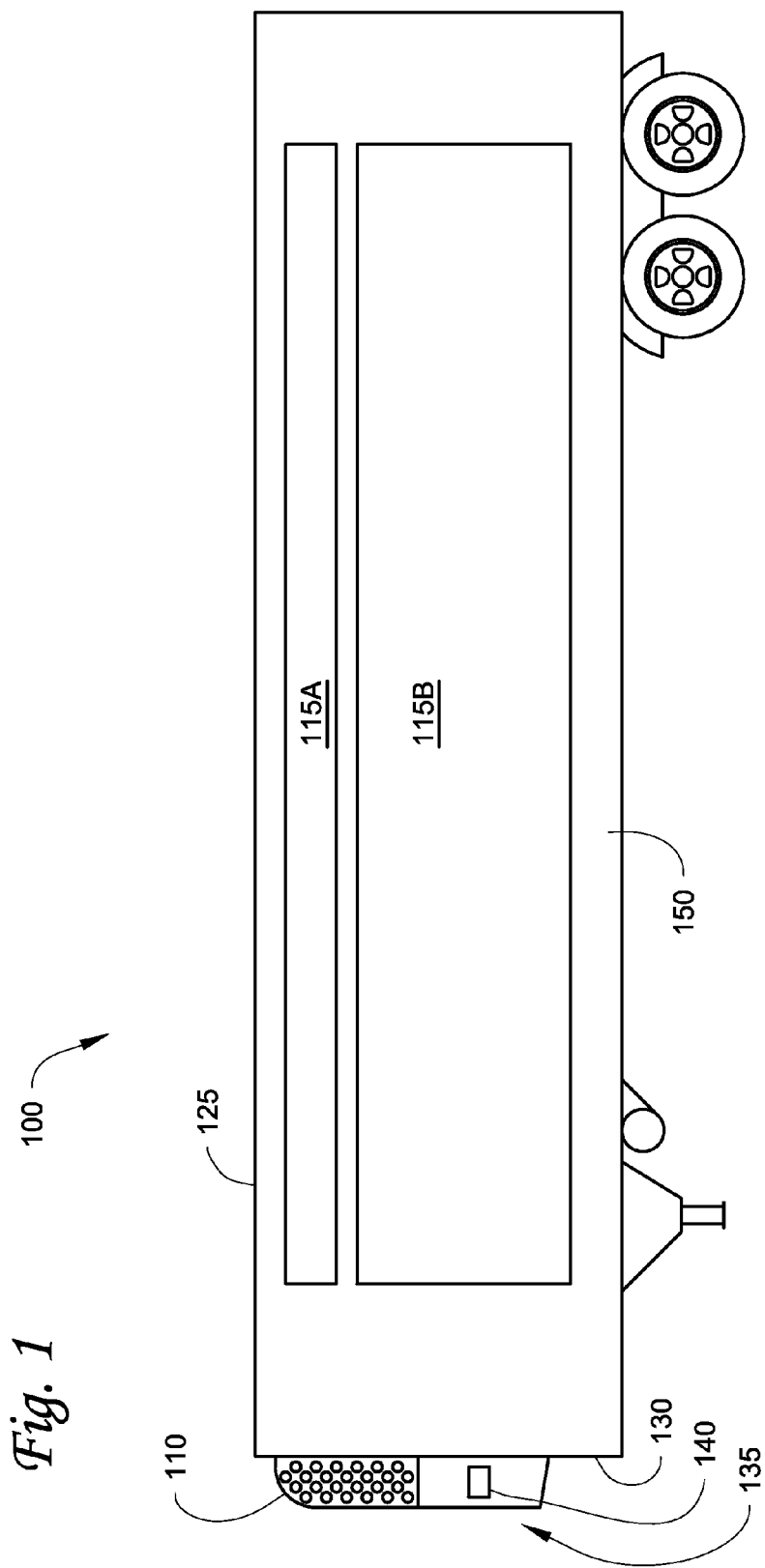
FIG. 1 illustrates a transport refrigeration system (TRS) for a refrigerated transport unit, according to some embodiments.

This disclosure is generally directed to a transport refrigeration system (TRS). More specifically, the disclosure is related to a TRS including a thermal accumulator having a phase change material (PCM) and a transport refrigeration unit (TRU).

As disclosed herein, a TRS can include a TRU which is attached to a transport unit to control one or more environmental conditions (e.g., temperature, humidity, air quality, etc.) of an interior space of the refrigerated transport unit. The TRU can include, without limitation, a compressor, a condenser, and condenser fans or blowers to control the heat exchange between the air within the interior space and the ambient air outside of the refrigerated transport unit. One or more thermal accumulators and/or thermal accumulator modules are disposed within the interior space. In some embodiments, the TRU can be a high capacity TRU. In other embodiments, the TRU can be a low capacity TRU. In some embodiments, the TRU can be a variable capacity TRU capable of operating in a high capacity mode or a low capacity mode. Because an evaporator is not required to be part of the TRU, in some embodiments the TRU may be lighter than a TRU including an evaporator. This can, for example, improve the fuel efficiency of the refrigerated transport unit. In some embodiments, this can also reduce a cost of the TRU. In other embodiments, evaporator fans/blowers are not required, which can reduce a power consumption of the TRU. In some embodiments, by connecting the heat exchanger of the thermal accumulator and the TRU, a refrigerated transport unit may be able to travel a longer distance than a refrigerated transport unit having one or more thermal accumulators without the TRU.

A thermal accumulator as used herein can include a thermal accumulator module. In such systems, one or more of the thermal accumulators can include a heat exchanger. The thermal accumulator can allow the TRU to be disabled for a period of time while still maintaining the one or more environmental conditions.

A "transport unit" includes, for example, a container on a flat car, an intermodal container, truck, a boxcar, or other similar transport unit.

A "refrigerated transport unit" includes, for example, a transport unit having a TRS. A refrigerated transport unit can be used to transport perishable items such as, but not limited to, produce, frozen foods, and meat products.

A "transport refrigeration system" (TRS) includes, for example, a refrigeration system for controlling an environmental condition such as, but not limited to, temperature, humidity, air quality, or the like, of a refrigerated transport unit. The TRS may be a vapor-compressor type refrigeration system, a thermal accumulator type system, or any other suitable refrigeration system that can use a heat transfer fluid, cold plate technology, or the like.

A "heat transfer fluid" includes, for example, refrigerant, a cryogenic liquid such as, but not limited to, liquid nitrogen, liquid carbon dioxide, or the like.

A "zone" includes, for example, a portion of an area of an interior space of the refrigerated transport unit.

A "high capacity transport refrigeration unit" (TRU) includes, for example, a TRU with a prime mover operating in a high speed mode. In some embodiments, a high capacity TRU, as described herein, can alternatively be referred to as a high capacity charging unit. In some embodiments, a high capacity TRU can also be a TRU with a higher cooling capacity. A high capacity TRU can, for example, consume more power, weigh more, and/or be larger in size than a low capacity TRU.

A "low capacity transport refrigeration unit" (TRU) includes, for example, a TRU with a prime mover operating in a low speed mode. In some embodiments, a low capacity TRU, as described herein, can alternatively be referred to as a low-capacity charging unit. In some embodiments, a low capacity TRU can also be a TRU with a lower cooling capacity. A low capacity TRU can, for example, consume less power, weigh less, and/or be smaller in size than a high capacity TRU.

A "variable capacity transport refrigeration unit" (TRU) includes, for example, a TRU capable of operating in a high capacity mode or a low capacity mode. The capacity can, for example, be varied by operating a prime mover for the TRU in a high speed mode (high capacity) or a low speed mode (low capacity). In some embodiments, a variable capacity TRU, as described herein, can alternatively be referred to as a variable capacity charging unit.

FIG. 1 illustrates a TRS 100 for a refrigerated transport unit 125, according to some embodiments. The TRS 100 includes a TRU 110 and one or more ceiling thermal accumulators 115A and/or one or more wall thermal accumulators 115B that control refrigeration within the refrigerated transport unit 125. The one or more ceiling thermal accumulators 115A can be disposed on a ceiling of the refrigerated transport unit 125. The one or more wall thermal accumulators 115B can be disposed on one or more walls of the refrigerated transport unit 125. For simplicity of this specification, the one or more ceiling thermal accumulators 115A and the one or more wall thermal accumulators 115B are referred to hereinafter as the thermal accumulators 115 unless specifically indicated otherwise.

The TRU 110 is disposed on a front wall 130 of the refrigerated transport unit 125. Examples of refrigerated transport units include, but are not limited to, a truck or trailer unit that can be attached to a tractor, a ship board container, an air cargo container or cabin, an over the road truck cabin, or the like. The TRU 110 includes a programmable TRS Controller 135 that may include a single integrated control unit 140 or that may include a distributed network of TRS control elements (not shown). The number of distributed control elements in a given network can depend upon the particular application of the principles described in this specification.

The refrigerated transport unit 125 includes an interior space 150. The interior space 150 can be divided into a plurality of zones, according to some embodiments. It is to be appreciated that the interior space 150 may be divided into any number of zones and in any configuration that is suitable for refrigeration of the different zones. In some examples, each of the zones can have a set point temperature that is the same or different from one another, and may be separated by a wall/partition (not shown).

The TRS controller 135 can include a processor, a memory, a clock, and an input/output (I/O) interface (not shown). The TRS controller 135 can include fewer or additional components. The TRS controller can be configured to enable/disable the TRU 110 to, for example, keep a PCM contained in a thermal accumulator within an on-phase temperature operating range and/or at a first state temperature.

Generally, the TRS Controller 135 is configured to control a heat transfer cycle of the TRS 100. In one example, the TRS Controller 135 controls the heat transfer cycle of the TRS 100 to obtain various operating conditions (e.g., temperature, humidity, air quality etc.) of the interior space 150. In some embodiments, this can include maintaining a PCM disposed within the thermal accumulators 115 at or near the PCM's corresponding phase change temperature at which the PCM changes from a first state to a second state. In other embodiments, this can include charging the thermal accumulators 115 and then operating the TRS 100 without running the TRU 110. In other embodiments, the thermal accumulators 115 can be charged and then maintained at or near the PCM's corresponding phase change temperature.

The refrigeration within the refrigerated transport unit 125 can be controlled using the thermal accumulators 115. The thermal accumulators 115 include a heat exchanger (e.g., heat exchanger 225 which is described in additional detail in accordance with FIG. 2 below). It is to be appreciated that one or more thermal accumulators 115 without a heat exchanger can additionally be included as part of the TRS 100. In such embodiments, the thermal accumulators 115 without heat exchangers can be removable and/or replaceable in order to allow for charging of the thermal accumulators 115 outside the refrigerated transport unit 125.

Figure 2:
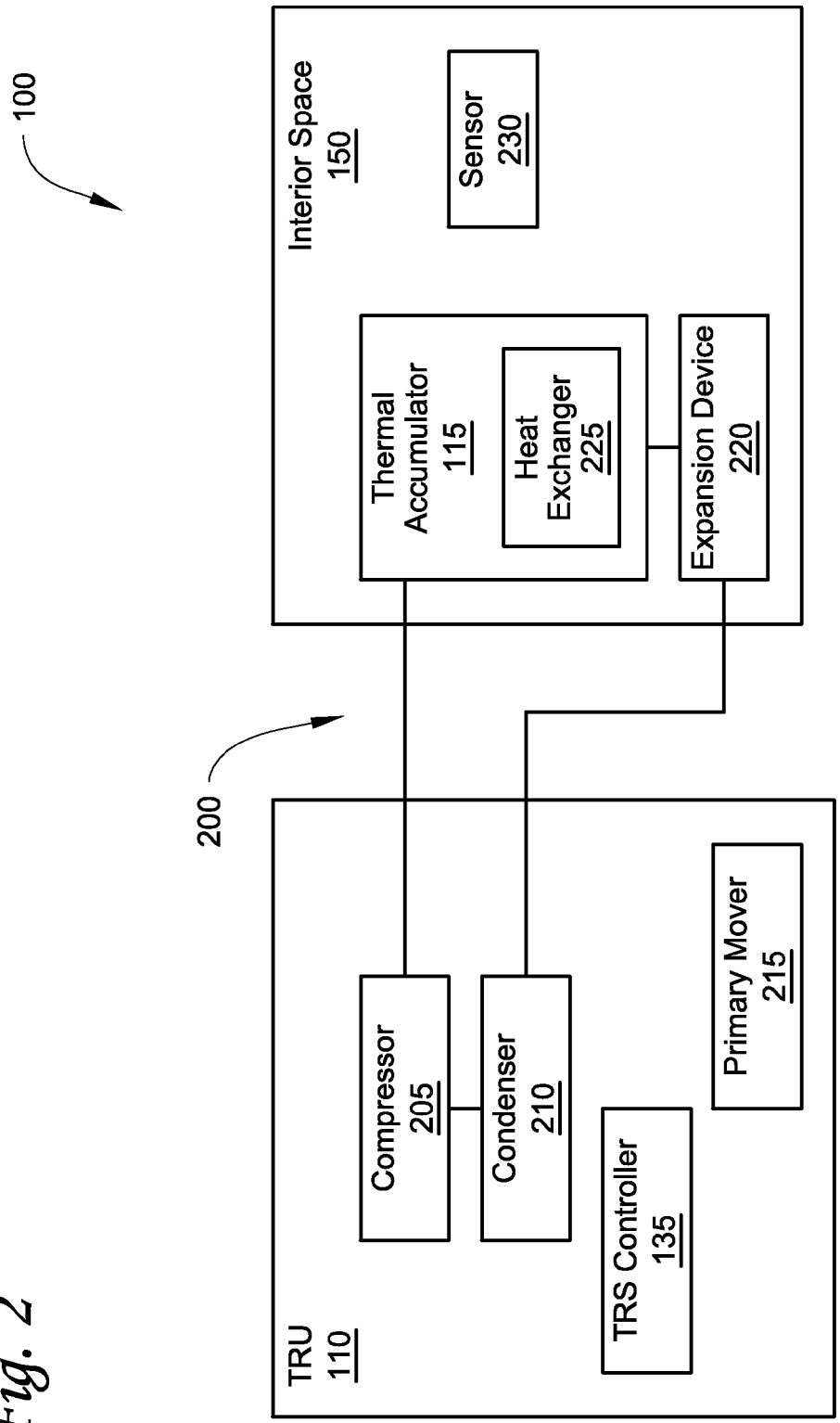
FIG. 2 illustrates a block diagram of a heat transfer circuit for the refrigerated transport unit of FIG. 1, according to some embodiments.

FIG. 2 illustrates a block diagram of the TRS 100 shown in FIG. 1 for maintaining one or more environmental conditions (e.g., temperature, humidity, air quality, etc.) of the interior space 150 using the TRU 110, according to some embodiments.

The TRU 110 includes a primary mover 215 (e.g., an engine). The primary mover 215 can be configured to drive a compressor 205. In some embodiments, the primary mover 215 can be coupled to the compressor 205 by a belt (not shown), a chain (not shown), or the like, such that the speed of the compressor 205 is proportional to the speed of the primary mover 215. In other embodiments, the primary mover 215 can drive a generator (not shown) that provides power to an electric motor (not shown) which drives the compressor 205.

The TRS controller 135 is in communication with one or more components of the TRU 110 including the primary mover 215. The TRS controller 135 can be configured to manage, command, direct, and regulate the behavior of one or more components of the TRU 110. For example, the TRS controller 135 can modify a speed of the primary mover 215. The TRS controller 135 can control the TRU 110 to obtain various operating conditions (e.g., temperature, humidity, air quality, etc.) of the interior space 150. The TRS controller 135 can be powered by the primary mover 215 and/or another power source electrically connected to the controller (e.g., a battery, an alternator, etc.).

The TRU 110 is configured to regulate one or more operating conditions (e.g., temperature, humidity, air quality, etc.) of the interior space 150 based on instructions received from the TRS controller 135. The TRU 110 includes a heat transfer circuit 200 connecting the TRU 110 and the heat exchanger 225 of the thermal accumulator 115 to direct a heat transfer fluid from the TRU 110 to the heat exchanger 225 and vice versa. The heat transfer circuit 200 is configured to provide fluid communication between the compressor 205, a condenser 210, an expansion device 220, and the heat exchanger 225. In some embodiments, the heat transfer fluid circuit 200 can include additional components, such as, but not limited to, a throttling device (e.g., an electronic throttling valve, etc.) or the like.

The primary mover 215 can, for example, be a diesel powered internal combustion engine, a gas powered internal combustion engine, or an electric motor. The specifications of the primary mover 215 may be dependent on the design of the transport refrigeration system 100. For example, the primary mover 215 can be a low speed engine or a high speed engine and have a corresponding horsepower rating. In some embodiments, a low speed engine can operate at about 1000 RPM (revolutions per minute) and a high-speed engine can operate at about 3000 RPM. It is to be appreciated that these RPM operating speeds are exemplary and that the actual RPM of the high speed and/or low speed engine can vary beyond the stated RPMs. In some embodiments, the primary mover 215 can be a variable speed engine capable of operating at either a low speed or a high speed. In some embodiments, the specifications of the primary mover 215 can determine an operating mode of the TRU 110 (e.g., a high capacity mode, a low capacity mode, etc.). The specifications of the primary mover 215 may also be dependent on the manufacturer.

A sensor 230 is disposed within the interior space 150. In some embodiments, the sensor 230 can be configured to monitor a temperature of the interior space in order for the TRS controller 135 to determine whether the interior space 150 is being maintained according to a set point temperature. The sensor 130 can also be a temperature sensor to monitor a temperature of the thermal accumulators 115. In other embodiments, the sensor 230 can be a sensor configured to monitor humidity, air quality (e.g., carbon dioxide, carbon monoxide, etc.), etc.

Figure 3:
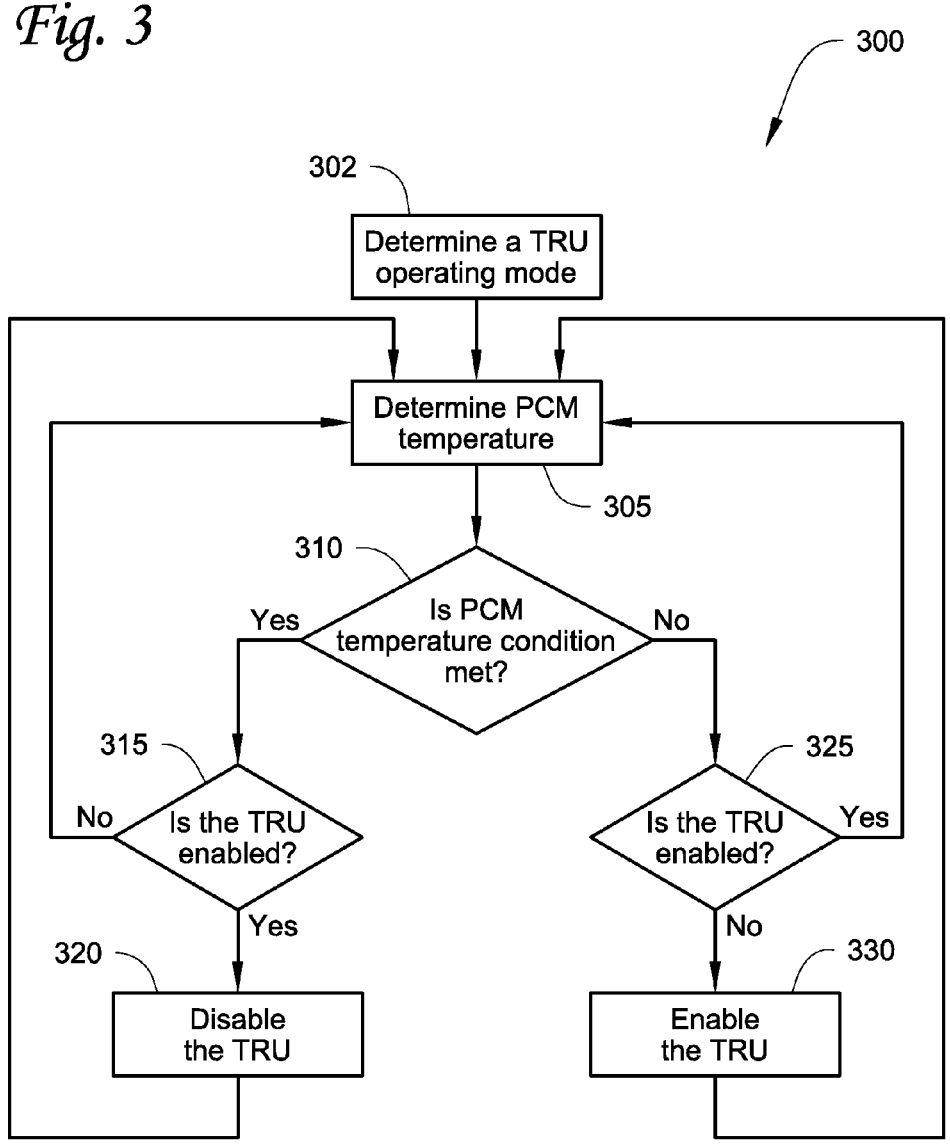
FIG. 3 illustrates a method for controlling a TRU, according to some embodiments.

FIG. 3 illustrates a method for controlling a TRU (e.g., the TRU 110 of FIGS. 1-2), according to some embodiments. The method 300 generally represents a method for determining a TRU operating mode and controlling the TRU based on the operating mode. The TRU controlled using the method 300 can be a high capacity TRU, a low capacity TRU, or a variable capacity TRU.

In some embodiments, the method 300 selectively enables/disables the TRU in order to keep a PCM temperature within an on-phase temperature range. In other embodiments, the method 300 selectively enables/disables the TRU in order to charge a PCM to a first state temperature.

The method 300 begins at 302. At 302, a TRS controller (e.g., the TRS controller 135 of FIGS. 1-2) determines an operating mode for the TRU. The operating mode may be determined based on a variety of conditions. For example, the operating mode may be user configurable so that a user can enable a low capacity mode, for example, for a duration of a trip, or a high capacity mode, for example, when a refrigerated transport unit (e.g., the refrigerated transport unit 125 of FIG. 1) is not in transit. In some embodiments, the operating mode may be determined based on whether an external power source (e.g., shore power) is provided. In such embodiments, the high capacity mode may be selected when the external power source is provided and the low capacity mode when the external power source is removed. In some embodiments, the operating mode may be determined based on the TRU and whether it is a low capacity TRU, a high capacity TRU, or a variable capacity TRU. In some embodiments, the TRS controller can be set to enter a particular mode on startup. In some embodiments, the particular mode on startup can be configurable.

At 305 the TRS controller determines a PCM temperature corresponding to a PCM in a thermal accumulator (e.g., the thermal accumulator 115 of FIGS. 1-2). In some embodiments, the PCM temperature can be determined based on a temperature of an interior space (e.g., the interior space 150 of FIGS. 1-2). In other embodiments, a sensor can be configured to determine a temperature of the thermal accumulator.

At 310, the TRS controller determines whether a PCM temperature condition has been met. The PCM temperature determined in 305 can be used for this determination. In some embodiments, the PCM temperature condition can be set based on the operating mode determined at 302. For example, in some embodiments, the PCM temperature condition can be whether the PCM temperature is within an on-phase temperature range. In other embodiments, the PCM temperature condition can be whether the PCM temperature is at or near a first state temperature that corresponds to a target temperature during charging. It is to be appreciated that the on-phase temperature range can include the first state temperature in some embodiments. Generally, the low capacity TRU corresponds to a PCM temperature condition including an on-phase temperature range and the high-capacity TRU corresponds to a PCM temperature condition including a first state temperature. It is to be appreciated, however, that the low capacity TRU can alternatively include a PCM temperature condition including a first state temperature and a high capacity TRU can include a PCM temperature condition including an on-phase temperature range.

In some embodiments, the low capacity TRU can be configured to charge the thermal accumulator. In such embodiments, the low capacity TRU can generally take an amount of time longer than the high capacity TRU to charge the thermal accumulator. In other embodiments, the high capacity TRU can be configured to maintain a thermal accumulator within an on-phase temperature operating range. In such embodiments, the high capacity TRU can run for a shorter period of time than the low capacity TRU functioning similarly.

The on-phase temperature range and/or the first state temperature can vary. In some embodiments, the on-phase temperature range and/or the first state temperature can be based on the design of the thermal accumulator (e.g., the PCM selected for the thermal accumulator, etc.). The on-phase temperature range and/or the first state temperature can also vary based on the type of cargo contained in the interior space of a refrigerated transport unit (e.g., the refrigerated transport unit 125 of FIG. 1). In some embodiments, the on-phase temperature range and/or the first state temperature can be configurable such that they can be modified based on a particular application.

If the PCM temperature condition is met at 310, the TRS controller determines at 315 whether the TRU is enabled. When the TRU is enabled, the primary mover (e.g., the primary mover 215 of FIG. 2) is driving the compressor (e.g., the compressor 205 of FIG. 2) and providing a heat transfer fluid to the heat exchanger (e.g., the heat exchanger 225 of FIG. 2). If the TRU is enabled, the TRS controller disables the TRU at 320. If, however, the TRU is not enabled, the method 300 returns to 305 and continues monitoring the PCM temperature.

If the PCM temperature condition is not met at 310, the TRS controller determines at 325 whether the TRU is enabled. If the TRU is enabled, the method 300 continues to 305 and continues monitoring the PCM temperature. If, however, the TRU is not enabled, the TRS controller enables the TRU at 330. Once the TRU is enabled, the method 330 returns to 305 and continues monitoring the PCM temperature.

The method 300 can repeat while the TRU is powered (e.g., throughout a duration of transport).

ASPECTS

It is noted that any of aspects 1-7 can be combined with any of aspects 8-12 and/or any of aspects 13-19. Any of aspects 8-12 can be combined with any of aspects 13-19.

Aspect 1. A transport refrigeration system (TRS) for controlling refrigeration in an interior space of a transport unit, comprising:
 a thermal accumulator including a phase change material (PCM) configured in a first state, to absorb thermal energy from the interior space of the transport unit during transformation to a second state;
 a heat exchanger, a portion of which is disposed within the thermal accumulator, wherein the portion is in thermal communication with the PCM;
 an expansion device;
 a transport refrigeration unit (TRU); and
 a heat transfer fluid circuit connecting the TRU and the heat exchanger, the heat transfer fluid circuit configured to direct a heat transfer fluid from the TRU to the heat exchanger via the expansion device for charging the PCM.

Aspect 2. The TRS according to aspect 1, wherein the TRU includes one or more of:
 a compressor, a condenser, and a primary mover configured to drive the compressor.

Aspect 3. The TRS according to aspect 1, further comprising:
 a TRS controller configured to selectively enable and disable the TRU to meet a PCM temperature condition.

Aspect 4. The TRS according to aspect 3, wherein the TRS controller is configured to selectively enable the TRU when the PCM temperature condition is not met and selectively disable the TRU when the PCM temperature condition is met.

Aspect 5. The TRS according to any of aspects 2-4, wherein the PCM temperature condition includes one of an on-phase temperature range and a first state temperature.

Aspect 6. The TRS according to aspect 5, wherein the TRS controller is further configured to selectively enable the TRU when a shore power source is connected to the TRU.

Aspect 7. The TRS according to any of aspects 1-6, wherein the TRU is one of a high capacity TRU, a low capacity TRU, and a variable capacity TRU.

Aspect 8. A method of charging a thermal accumulator in a transport refrigeration system (TRS) for a transport unit, the thermal accumulator including a phase change material (PCM) and a heat exchanger, and a heat transfer fluid circuit connecting a transport refrigeration unit (TRU) with the heat exchanger, the method comprising:
 determining a PCM temperature based on a temperature corresponding to the PCM;
 comparing the PCM temperature to a PCM temperature condition to obtain a comparison result; and
 enabling the TRU based on the comparison result.

Aspect 9. The method according to aspect 8, wherein determining the PCM temperature includes:
 determining a temperature of an interior space of the transport unit from a temperature sensor.

Aspect 10. The method according to any of aspects 8-9, wherein determining the PCM temperature includes:
 determining a temperature of the thermal accumulator.

Aspect 11. The method according to any of aspects 8-10, wherein the PCM temperature condition includes an on-phase temperature range and the enabling includes enabling the TRU when the temperature is outside the on-phase temperature range.

Aspect 12. The method according to any of aspects 8-11, further comprising:
 disabling the TRU when the PCM temperature condition is met.

Aspect 13. A refrigerated transport unit, comprising:
 a transport unit including an interior space;
 a transport refrigeration system, including:
  a thermal accumulator including a phase change material (PCM) configured in a first state, to absorb thermal energy from the interior space of the transport unit during transformation to a second state;
  a heat exchanger, a portion of which is disposed within the thermal accumulator, wherein the portion is in thermal communication with the PCM;
  an expansion device;
  a transport refrigeration unit (TRU); and
  a heat transfer fluid circuit connecting the TRU and the heat exchanger, the heat transfer fluid circuit configured to direct a heat transfer fluid from the TRU to the heat exchanger via the expansion device for charging the PCM.

Aspect 14. The refrigerated transport unit according to aspect 13, wherein the TRU includes one or more of:
 a compressor, a condenser, and a primary mover configured to drive the compressor.

Aspect 15. The refrigerated transport unit according to aspect 13, further comprising:
 a TRS controller configured to selectively enable and disable the TRU to maintain a PCM temperature condition.

Aspect 16. The refrigerated transport unit according to aspect 15, wherein the TRS controller is configured to selectively enable the TRU when the PCM temperature condition is not met and selectively disable the TRU when the PCM temperature condition is met.

Aspect 17. The refrigerated transport unit according to any of aspects 14-16, wherein the PCM temperature condition includes one of an on-phase temperature range and a first state temperature.

Aspect 18. The refrigerated transport unit according to aspect 17, wherein the TRS controller is further configured to selectively enable the TRU when a shore power source is connected to the TRU.

Aspect 19. The refrigerated transport unit according to any of aspects 13-18, wherein the TRU is one of a high capacity TRU, a low capacity TRU, and a variable capacity TRU.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A transport refrigeration system (TRS) for controlling refrigeration in an interior space of a transport unit, comprising:
 a thermal accumulator including a phase change material (PCM) configured in a first state, to absorb thermal energy from the interior space of the transport unit during transformation to a second state, wherein the PCM has a solid-liquid transition point in a range from −32° C. to 0° C. and the PCM is compatible with aluminum;
 a heat exchanger, a portion of which is disposed within the thermal accumulator, wherein the portion is in thermal communication with the PCM, wherein the heat exchanger includes a plurality of passes disposed within the thermal accumulator;
 an expansion device;
 a transport refrigeration unit (TRU), the TRU including:
  a single compressor, and
  a primary mover, the primary mover being mechanically coupled to the compressor to drive the compressor, wherein a speed of the compressor is proportional to
 a speed of the primary mover; and
 a heat transfer fluid circuit connecting the TRU and the heat exchanger, the heat transfer fluid circuit configured to direct a heat transfer fluid from the TRU to the heat exchanger via the expansion device for charging the PCM.

2. The TRS according to claim 1, wherein the TRU further includes a condenser.

3. The TRS according to claim 1, further comprising:
 a TRS controller configured to selectively enable and disable the TRU to meet a PCM temperature condition.

4. The TRS according to claim 3, wherein the TRS controller is configured to selectively enable the TRU when the PCM temperature condition is not met and selectively disable the TRU when the PCM temperature condition is met.

5. The TRS according to claim 2, wherein the PCM temperature condition includes one of an on-phase temperature range and a first state temperature.

6. The TRS according to claim 3, wherein the TRS controller is further configured to selectively enable the TRU when a shore power source is connected to the TRU.

7. The TRS according to claim 1, wherein the TRU is one of a high capacity TRU, a low capacity TRU, and a variable capacity TRU.

8. A method of charging a thermal accumulator in a transport refrigeration system (TRS) for a transport unit, the thermal accumulator including a phase change material (PCM) and a heat exchanger, and a heat transfer fluid circuit connecting a transport refrigeration unit (TRU) with the heat exchanger, wherein the PCM has a solid-liquid transition point in a range from −32° C. to 0° C., the PCM is compatible with aluminum, and the heat exchanger includes a plurality of passes disposed within the thermal accumulator, the method comprising:
 determining a PCM temperature based on a temperature corresponding to the PCM;
 comparing the PCM temperature to a PCM temperature condition to obtain a comparison result; and
 enabling the TRU based on the comparison result, wherein enabling the TRU includes:
  enabling a primary mover that is mechanically connected to a single compressor of the TRU such that the compressor is operated at a speed that is proportional to a speed of the primary mover.

9. The method according to claim 8, wherein determining the PCM temperature includes:
 determining a temperature of an interior space of the transport unit from a temperature sensor.

10. The method according to claim 8, wherein determining the PCM temperature includes:
 determining a temperature of the thermal accumulator.

11. The method according to claim 8, wherein the PCM temperature condition includes an on-phase temperature range and the enabling includes enabling the TRU when the temperature is outside the on-phase temperature range.

12. The method according to claim 8, further comprising:
 disabling the TRU when the PCM temperature condition is met.

13. A refrigerated transport unit, comprising:
 a transport unit including an interior space;
 a transport refrigeration system, including:
  a thermal accumulator including a phase change material (PCM) configured in a first state, to absorb thermal energy from the interior space of the transport unit during transformation to a second state, wherein the PCM has a solid-liquid transition point in a range from −32° C. to 0° C. and the PCM is compatible with aluminum;
  a heat exchanger, a portion of which is disposed within the thermal accumulator, wherein the portion is in thermal communication with the PCM, wherein the heat exchanger includes a plurality of passes disposed within the thermal accumulator;
  an expansion device;
  a transport refrigeration unit (TRU), the TRU including:
   a single compressor, and
   a primary mover, the primary mover being mechanically coupled to the compressor to drive the compressor, wherein a speed of the compressor is proportional to a speed of the primary mover; and
  a heat transfer fluid circuit connecting the TRU and the heat exchanger, the heat transfer fluid circuit configured to direct a heat transfer fluid from the TRU to the heat exchanger via the expansion device for charging the PCM.

14. The refrigerated transport unit according to claim 13, wherein the TRU further includes a condenser.

15. The refrigerated transport unit according to claim 13, further comprising:
 a TRS controller configured to selectively enable and disable the TRU to maintain a PCM temperature condition.

16. The refrigerated transport unit according to claim 15, wherein the TRS controller is configured to selectively enable the TRU when the PCM temperature condition is not met and selectively disable the TRU when the PCM temperature condition is met.

17. The refrigerated transport unit according to claim 15, wherein the PCM temperature condition includes one of an on-phase temperature range and a first state temperature.

18. The refrigerated transport unit according to claim 15, wherein the TRS controller is further configured to selectively enable the TRU when a shore power source is connected to the TRU.

19. The refrigerated transport unit according to claim 13, wherein the TRU is one of a high capacity TRU, a low capacity TRU, and a variable capacity TRU.

* * * * *